Figure 1:
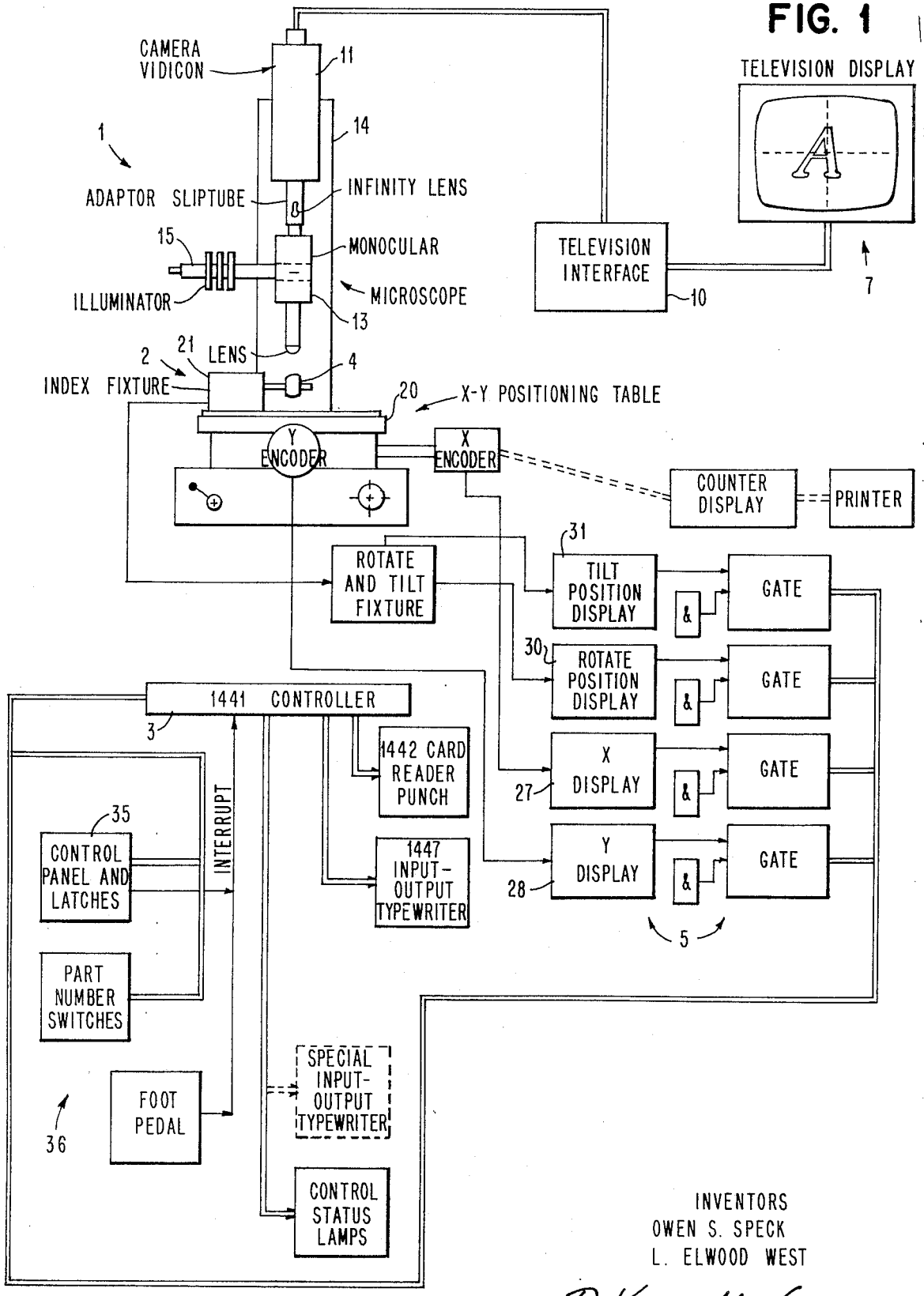
Figure 2:
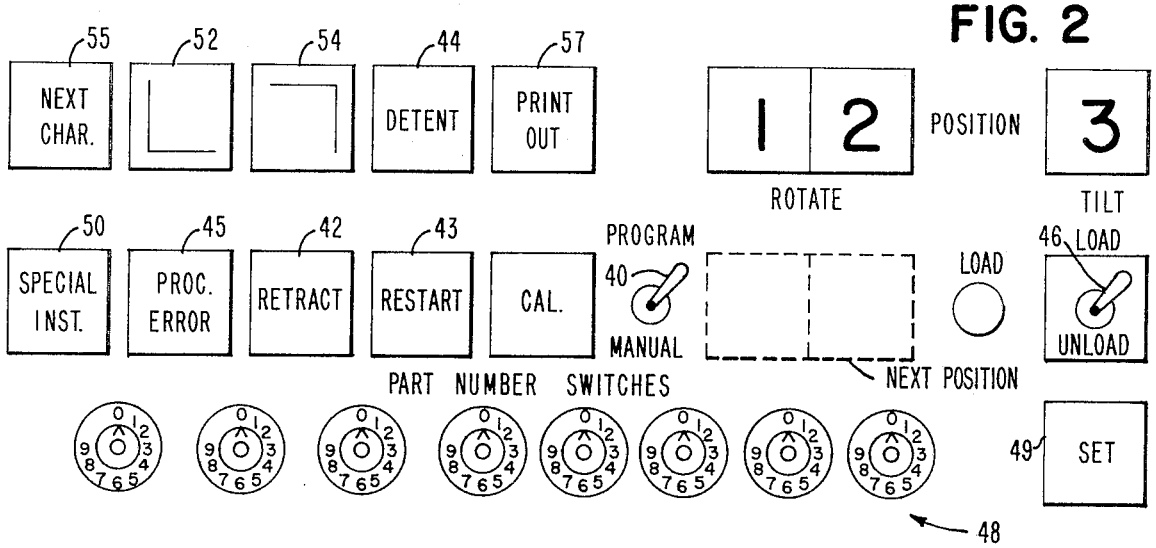
Figure 3:
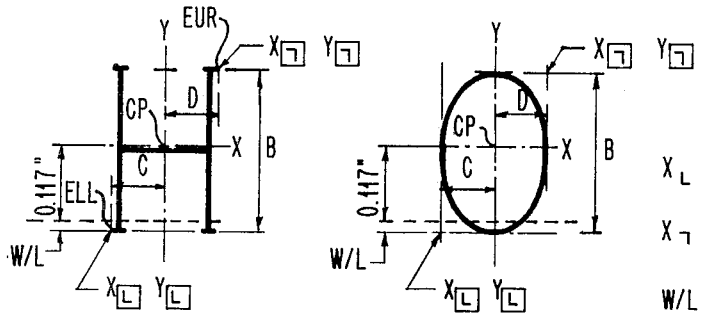
Figure 4:
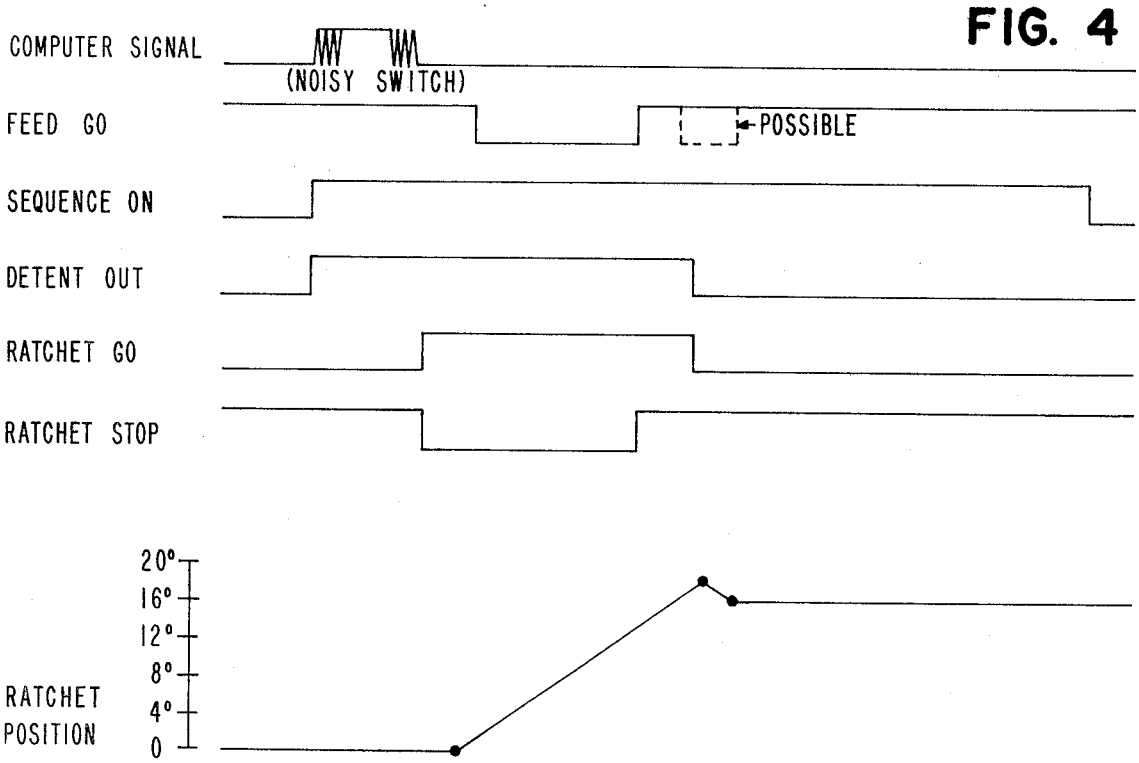
Figure 6:
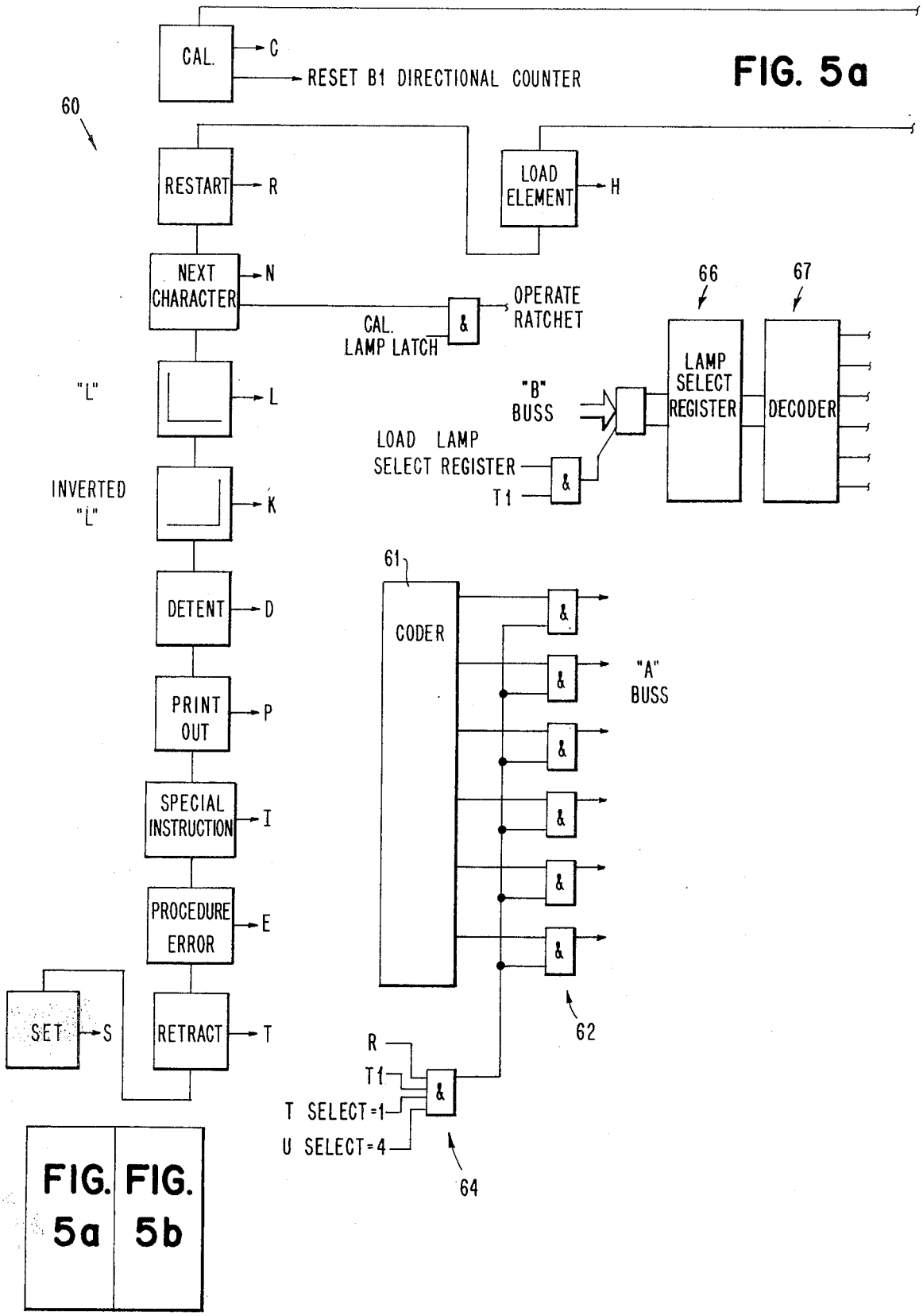
Figure 5B:
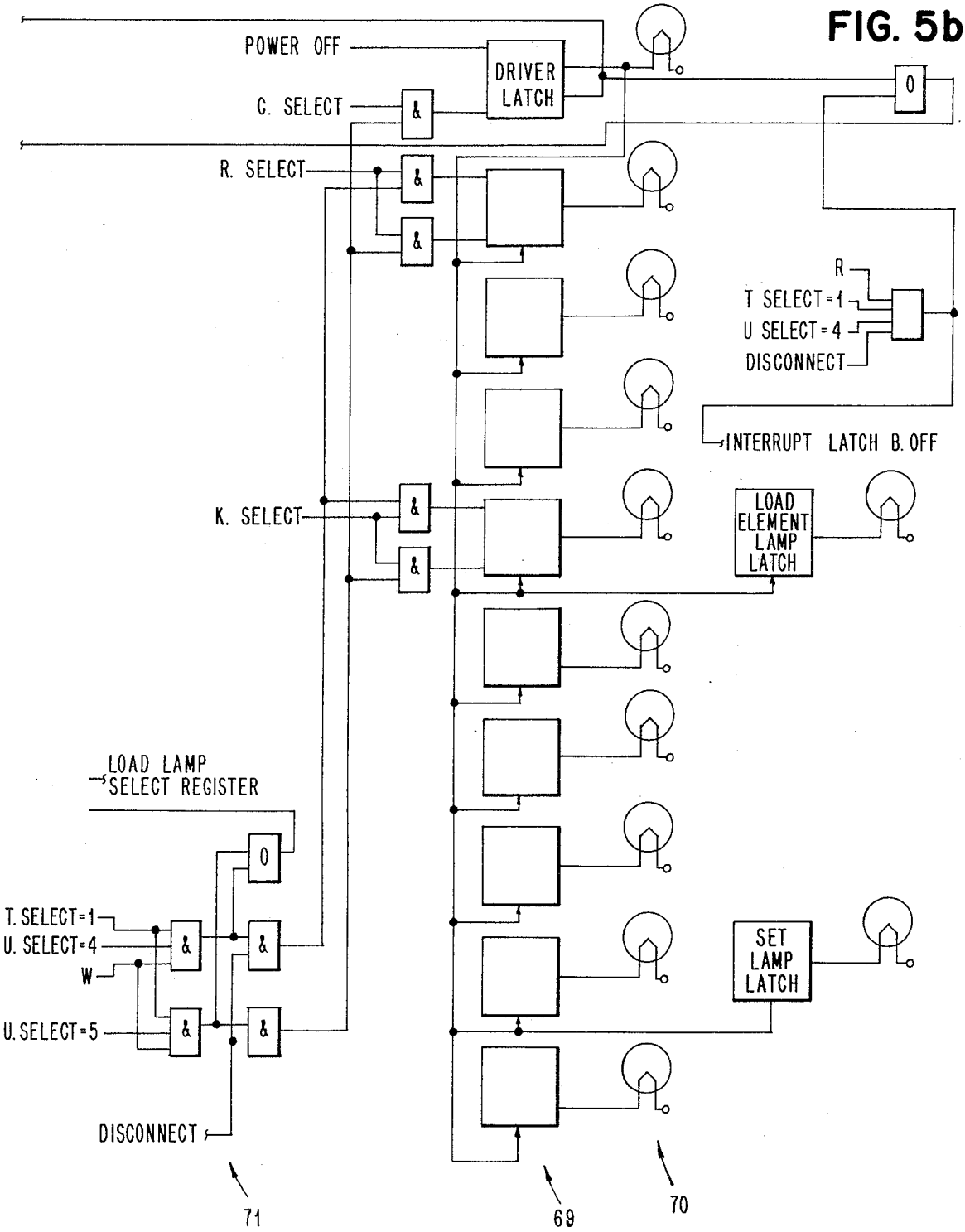
Figure 10A:
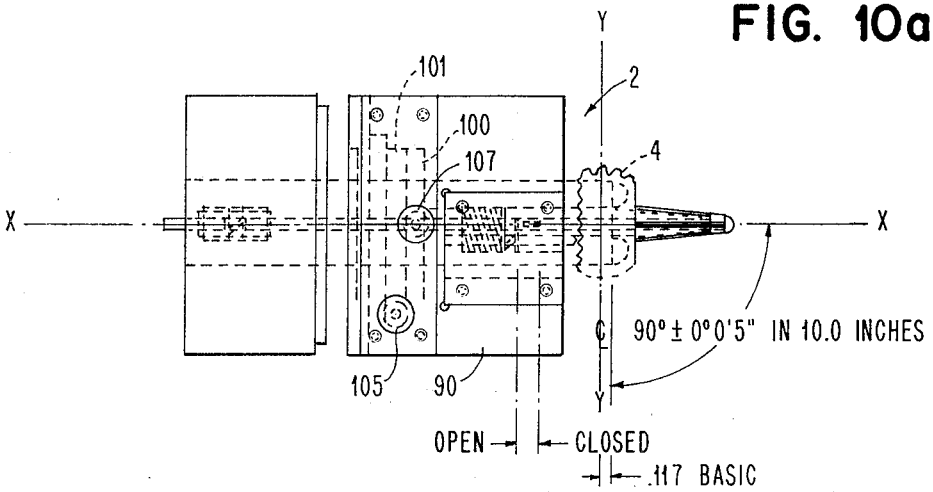
Figure 10B:
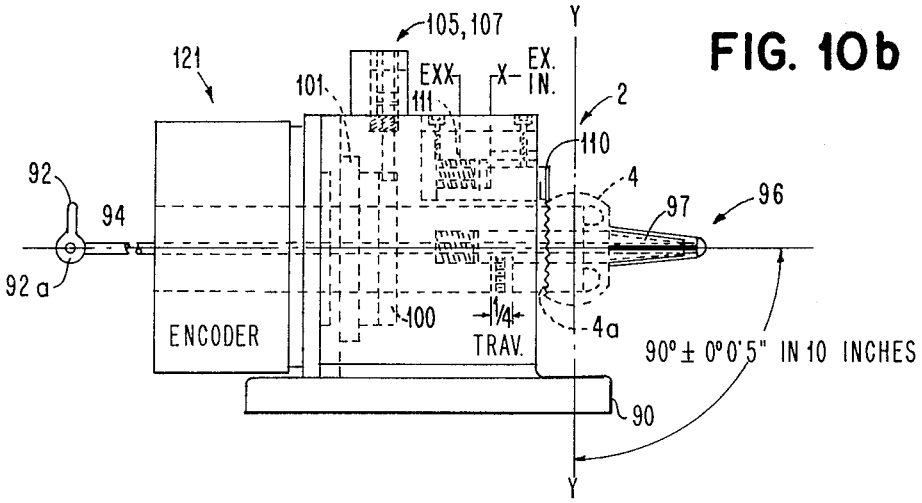
Figure 10C:
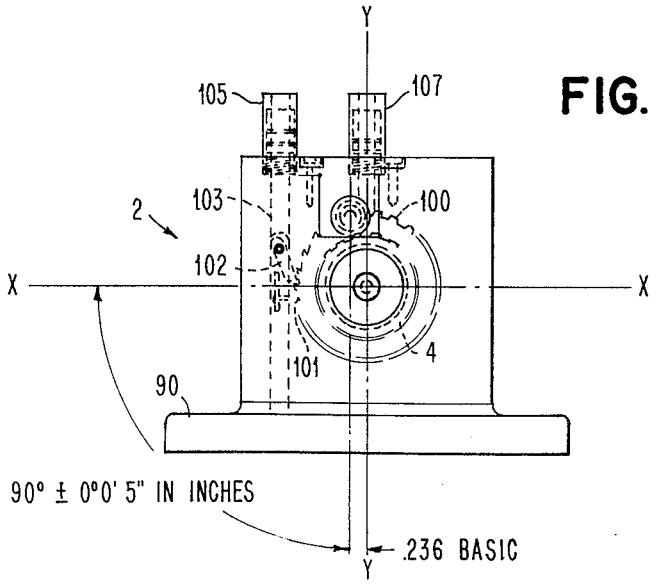
Figure 11:
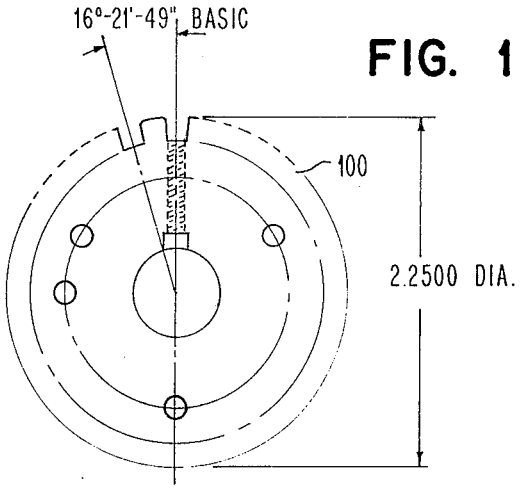
Figure 12:
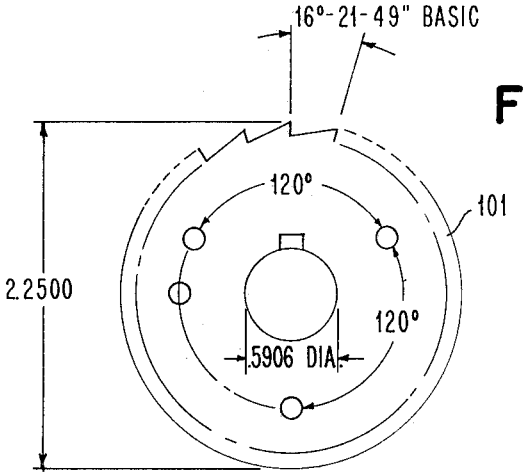
Figure 13:
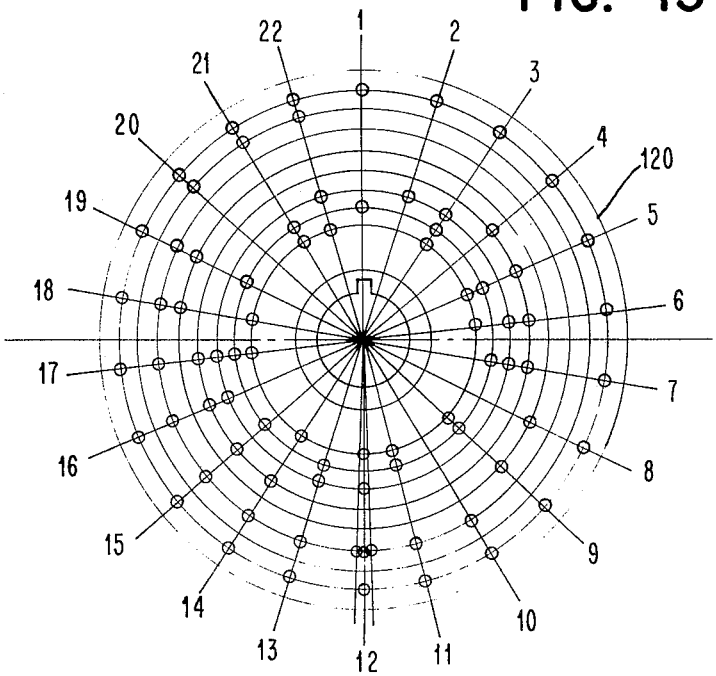
Figures 14A, 14B, 14C, 15A, 15B:
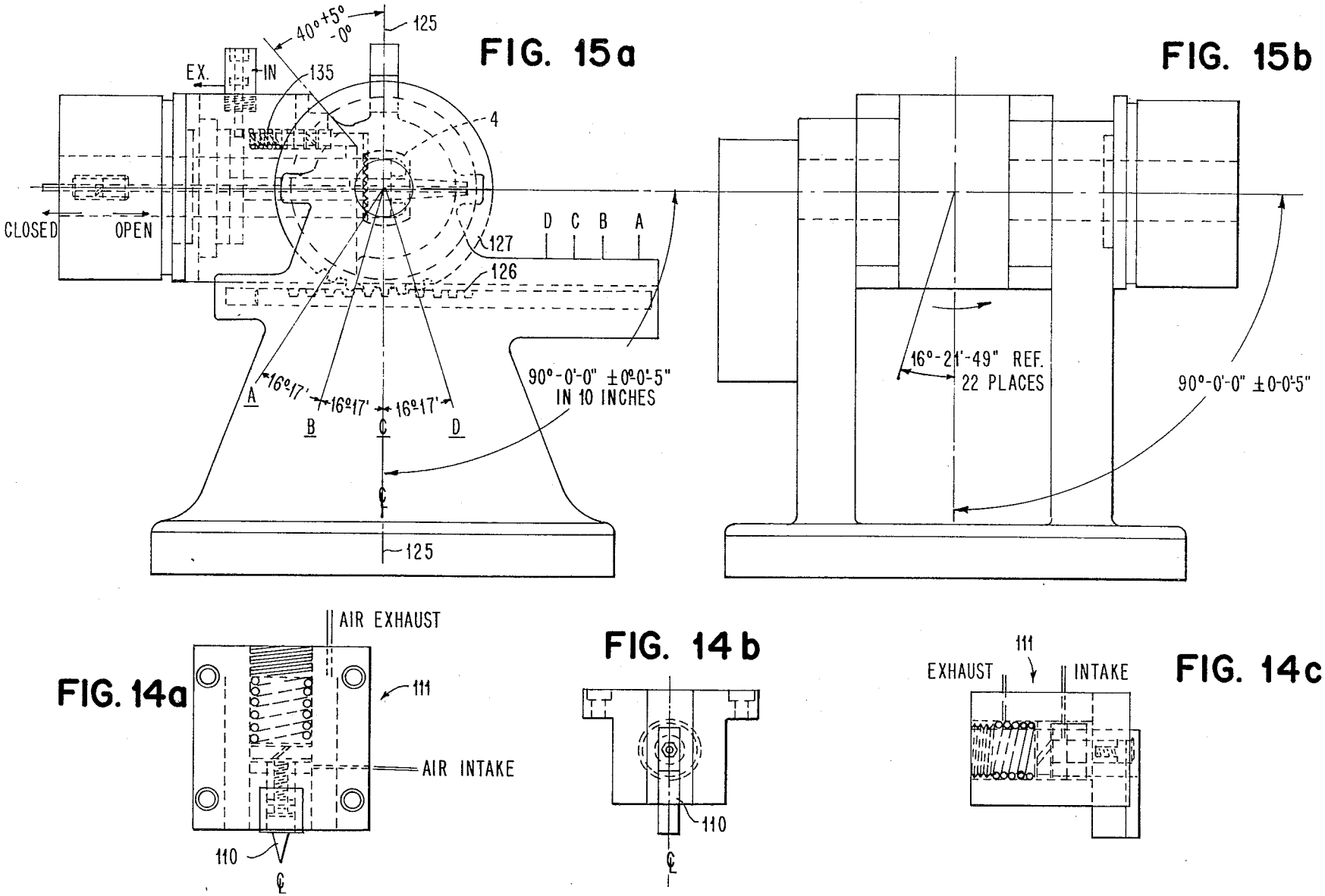
Figure 16A:
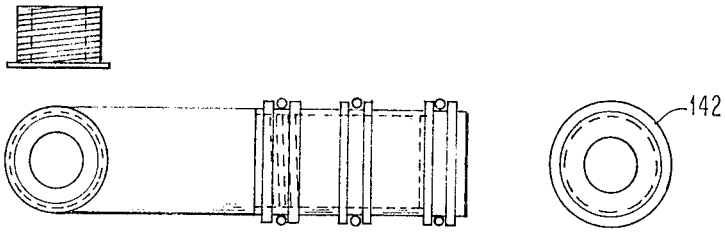
Figure 16B:
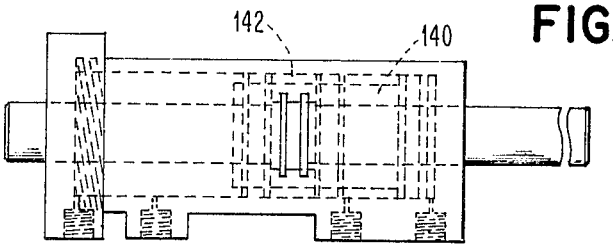
Figure 16C:
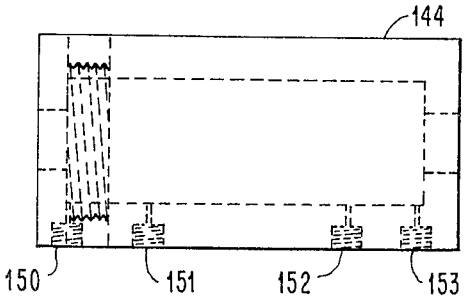
Figure 16D:
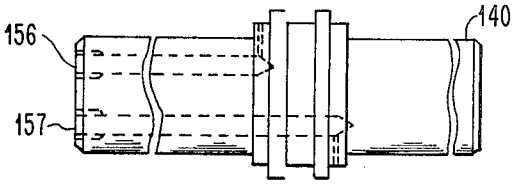
Figure 16E:
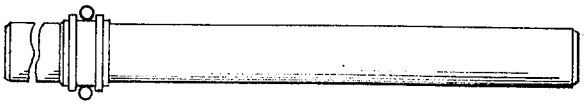
Figure 16F:
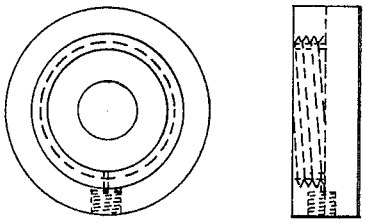

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 30

T945,006

SYSTEM FOR MAGNIFYING, INSPECTING, AND ANALYZING COMPONENTS

Owen S. Speck, 3516 Merrick Court, and L. Elwood West, 3531 Greentree Road, both of Lexington, Ky. 40502

Continuation of application Ser. No. 415,278, Nov. 12, 1973, which is a continuation-in-part of application Ser. No. 91,086, Nov. 9, 1970. This application Jan. 23, 1975, Ser. No. 543,603

Int. Cl. H04n *7/18*

US. Cl. 178—6.8

14 Sheets Drawing. 37 Pages Specification

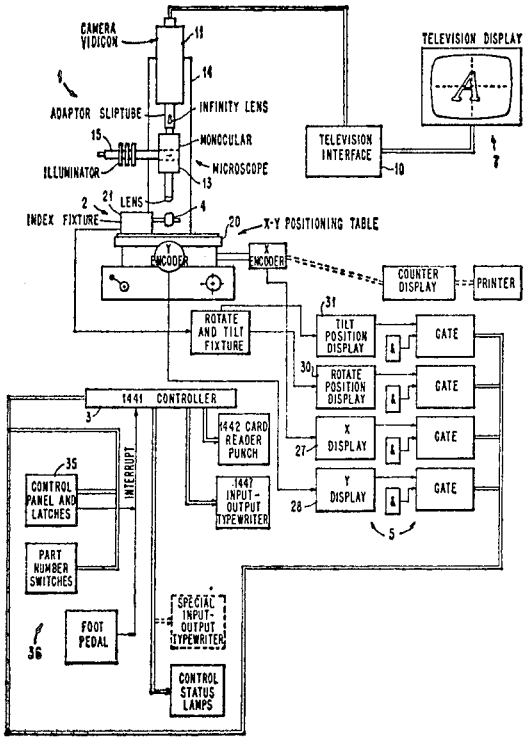

The system includes microscope 1 and fixture 2 to position type element 4, and to enable rotational movement of typehead 4 for inspection of individual characters. IBM 1441 controller 3 with associated input/output equipment is interconnected by interface 5. In conjunction with display unit 7, having reference scales, the operator positions X-Y table 20 for measurement of selected character dimensions, and depresses a pushbutton on control panel 35. This enters the measurements into the memory of the 1441 controller. The rotate position, the tilt position, and the part number are also read into the memory of the 1441 controller. From this information, controller 3 performs a table lookup operation to determine measurement differences, if any. After dimensions of all characters (or selected characters) on a particular type element have been checked, the output is printed by an IBM 1447 typewriter, and punched on cards by an IBM 1442 card reader punch.

SYSTEM FOR MAGNIFYING, INSPECTING, AND ANALYZING COMPONENTS

Original Filed Jan. 23, 1975

INVENTORS
OWEN S. SPECK
L. ELWOOD WEST

BY D. Kendall Cooper
ATTORNEY

DEFINITION OF PARAMETERS $X_L$ $Y_L$ - COORDINATES OF X-Y TABLE WHEN L PUSHBUTTON IS DEPRESSED $X_\neg$ $Y_\neg$ - COORDINATES OF X-Y TABLE WHEN PUSHBUTTON IS DEPRESSED $W/L = -Y_L - 0.117$, $C = -X_L$ $B = Y_\neg - Y_L$, $D = X_\neg$

TIMING DIAGRAM FOR AUTO-ROTATE LOGIC

FIG. 7a

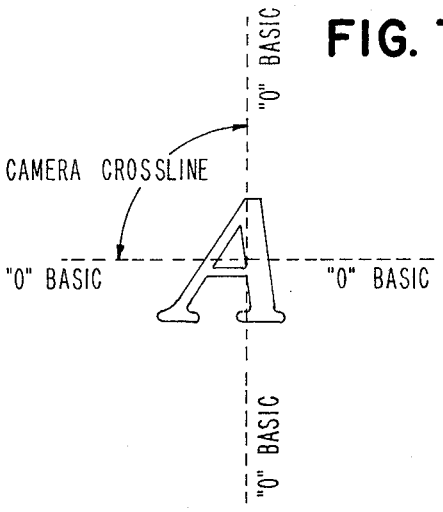

FIG. 7b

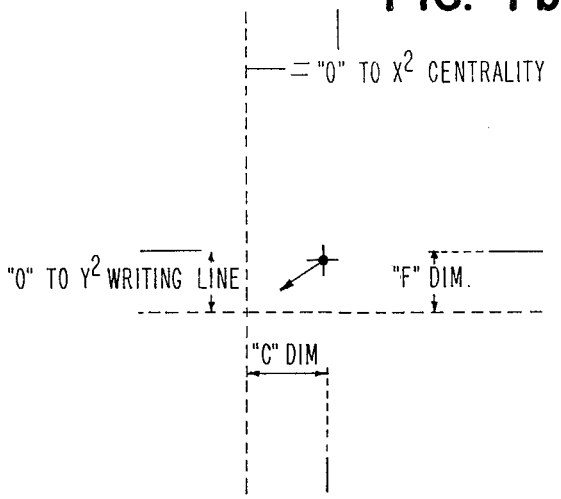

FIG. 7c

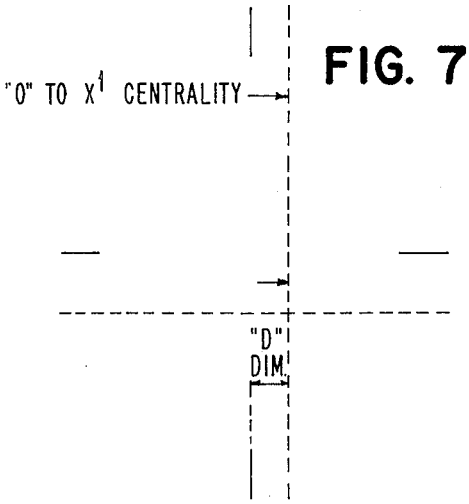

FIG. 7d

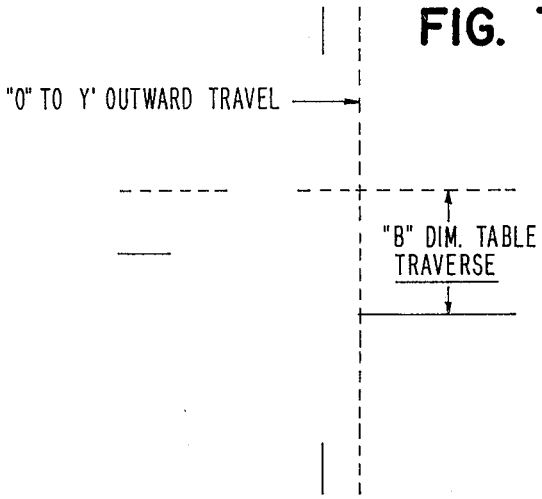

FIG. 7e

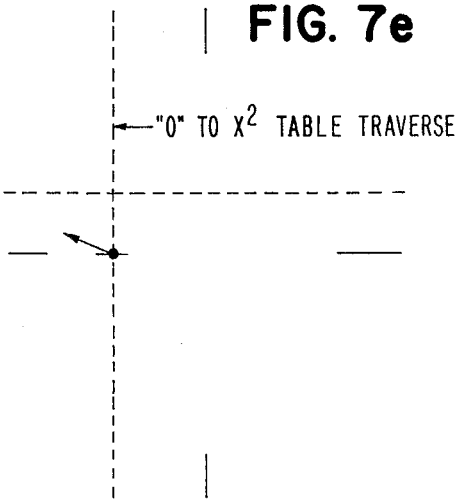

FIG. 7f

LEGEND

.0000 TO $X^1$ = LEFT HAND TRAVEL OF POSITIONING TABLE
.0000 TO $X^2$ = RIGHT HAND TRAVEL OF POSITIONING TABLE
.0000 TO $Y^1$ = OUTWARD TRAVEL OF POSITIONING TABLE
.0000 TO $Y^2$ = INWARD TRAVEL OF POSITIONING TABLE
.0000 TO $X^1$ = "F" DIMENSION (WRITING LINE)
.0000 TO $X^1$ + .0000 TO X = "B" DIM. (OVERALL CHARACTER HEIGHT)
.0000 TO $Y^1$ = "C" DIMENSION
.0000 TO $Y^2$ = "D" DIMENSION
.0000 TO $Y^1$ + .0000 TO $Y^2$ = (CHARACTER WIDTH)
T = TILT ANGLE
D = DETENTING CHARACTER

FIG. 8
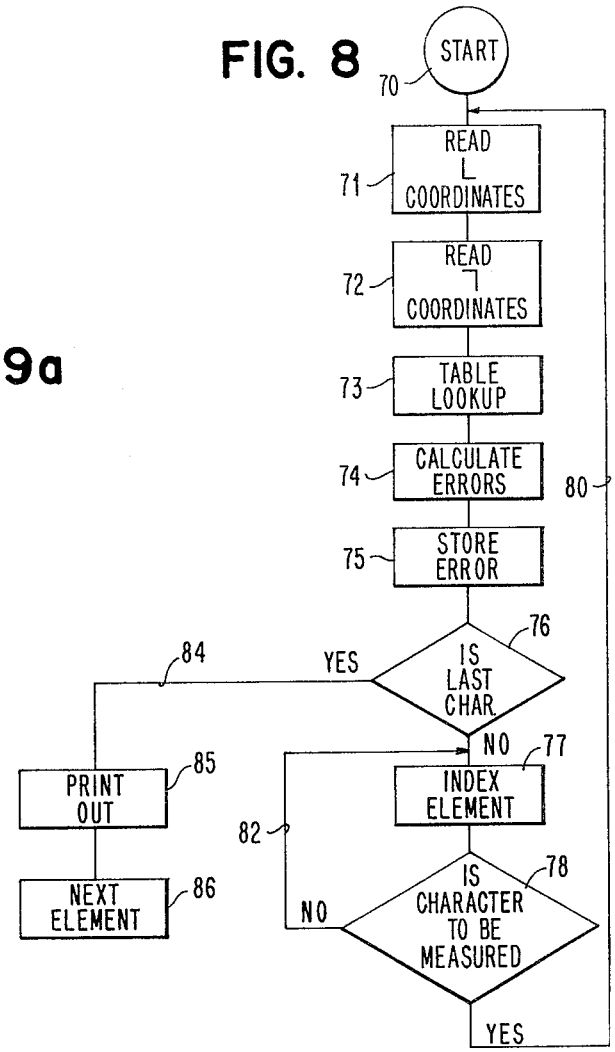
FIG. 9a
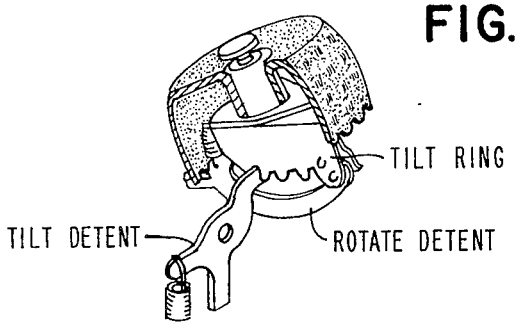
FIG. 9b
TYPEHEAD LAYOUT
T-# = TILT LATCHES ACTIVE
R-#'s = ROTATE LATCHES ACTIVE
| | UPPER CASE | | | | | | | | | | | LOWER CASE | | | | | | | | | | | |
|---|---|---|---|---|---|---|---|---|---|---|---|---|---|---|---|---|---|---|---|---|---|---|---|
| | -5 | -4 | -3 | -2 | -1 | 0 | +1 | +2 | +3 | +4 | +5 | -5 | -4 | -3 | -2 | -1 | 0 | +1 | +2 | +3 | +4 | +5 | |
| B | ■ | ■ | ■ | ■ | @ | > | ■ | ■ | ■ | : | √ | 1 | 3 | 5 | 7 | 8 | 0 | 2 | 4 | 6 | 9 | # | T-0 |
| C | ■ | ■ | ■ | ‡ | % | \ | ■ | ■ | ■ | } | ⧺ | / | T | V | X | Y | b | S | U | W | Z | , | T-1 |
| D | ■ | ■ | ■ | ! | ⁂ | ; | ■ | ■ | ■ | ] | △ | J | L | N | P | Q | – | K | M | O | R | S | T-2 |
| | ■ | ■ | ■ | ? | ¤ | < | ■ | ■ | ■ | [ | ‡ | A | C | E | G | H | & | B | D | F | I | • | T-1,2 |
| | R-5 | R-5,1 | R-5,2 | R-5,2,1 | R-5,2,2A | * | R-1 | R-2 | R-1,2 | R-2,2A | R-1,2,2A | R-5 | R-5,1 | R-5,2 | R-5,2,1 | R-5,2,2A | * | R-1 | R-2 | R-1,2 | R-2,2A | R-1,2,2A | |
| C | E | # | & | ⁂ | $ | Z | @ | % | ¢ | ) | ( | ] | 3 | 7 | 8 | 4 | z | 2 | 5 | 6 | 0 | 9 | T-0 |
| O | X | U | D | C | L | T | N | E | K | H | B | x | u | d | c | 1 | t | n | e | k | h | b | T-1 |
| R | M | V | R | A | O | ° | . | " | I | S | W | m | v | r | a | o | ! | . | ' | i | s | w | T-2 |
| R | G | F | : | , | ? | J | + | P | Q | Y | _ | g | f | ; | , | / | i | = | p | q | y | – | T-1,2 |
| | | | | | | HOME | | | | | | | | | | | HOME | | | | | | |

90°-0'-0" ±0-0'-5"
16°-21'-49" REF.
22 PLACES

90°-0'-0" ±0°0'-5"
IN 10 INCHES
A
B
C
D
4
127
126
125
135
40°+5°-0°
IN
EX.
16°17'
16°17'
16°17'
A
B
D
OPEN
CLOSED

INTAKE
111
EXHAUST

110

AIR EXHAUST
111
AIR INTAKE
110

Figure 17B:
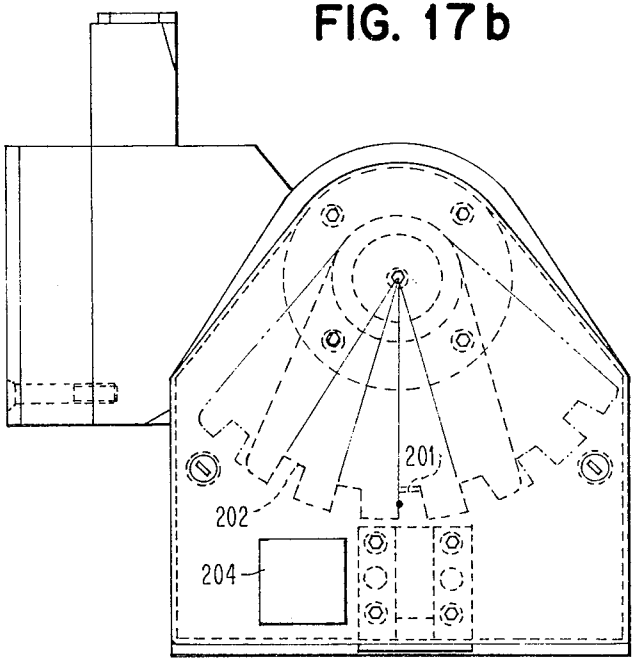
Figure 17A:
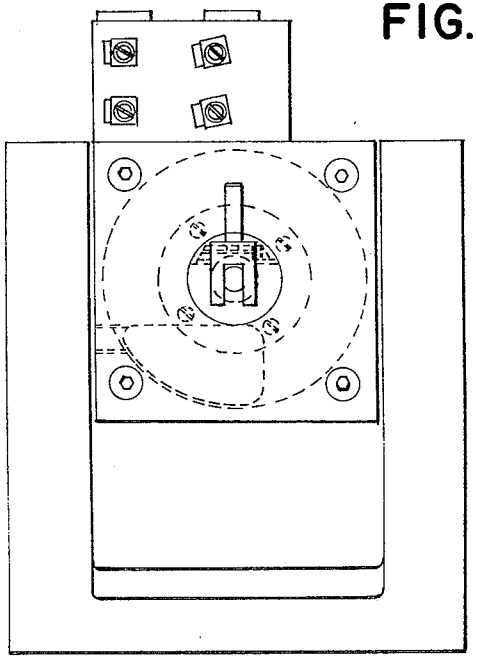
Figure 17D:
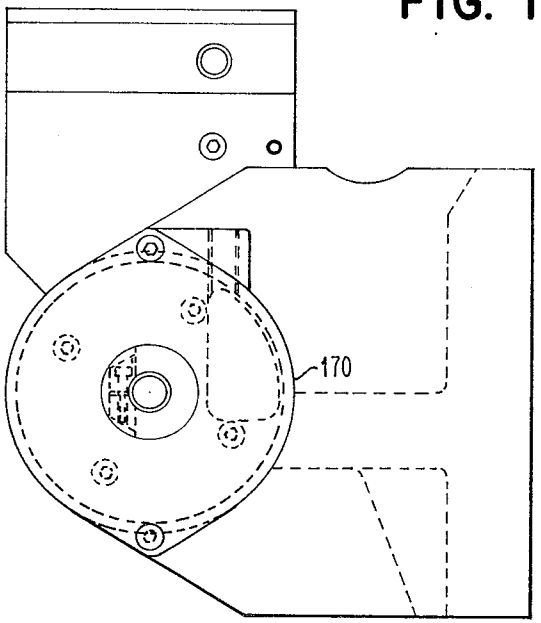
Figure 17C:
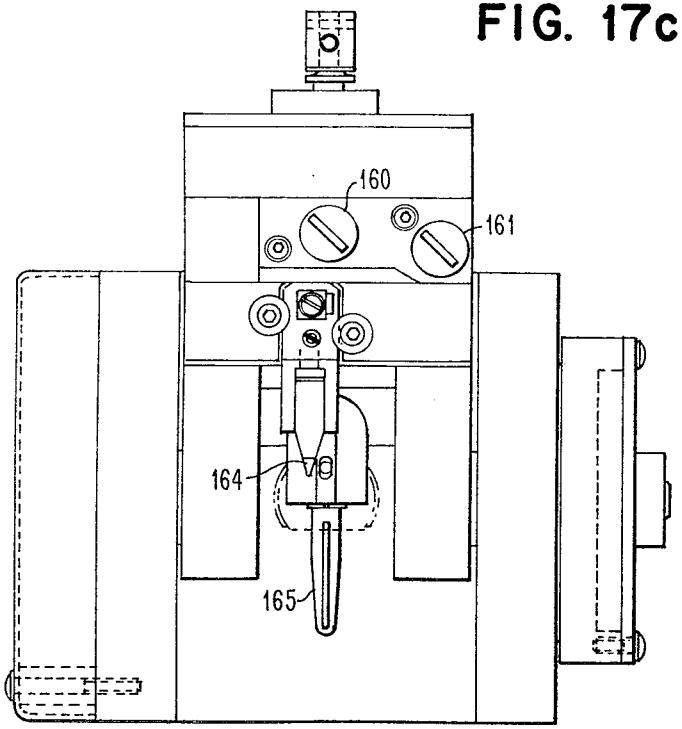
Figure 17F:
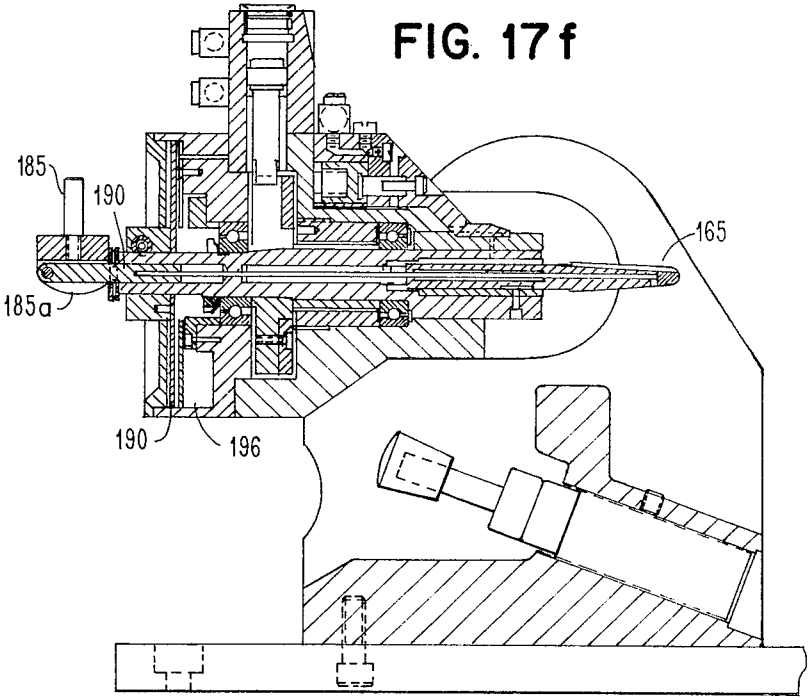
Figure 17E:
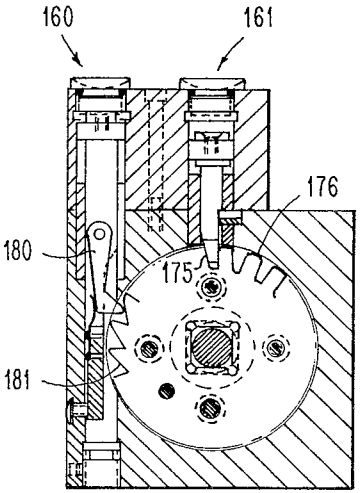

FIG. 17g
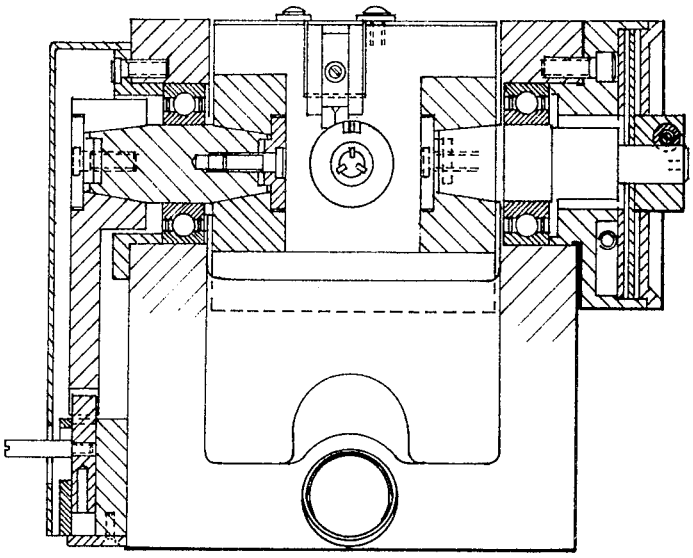
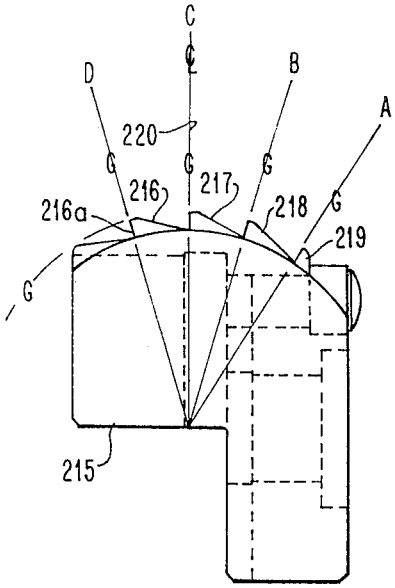
FIG. 18